FIG. 4

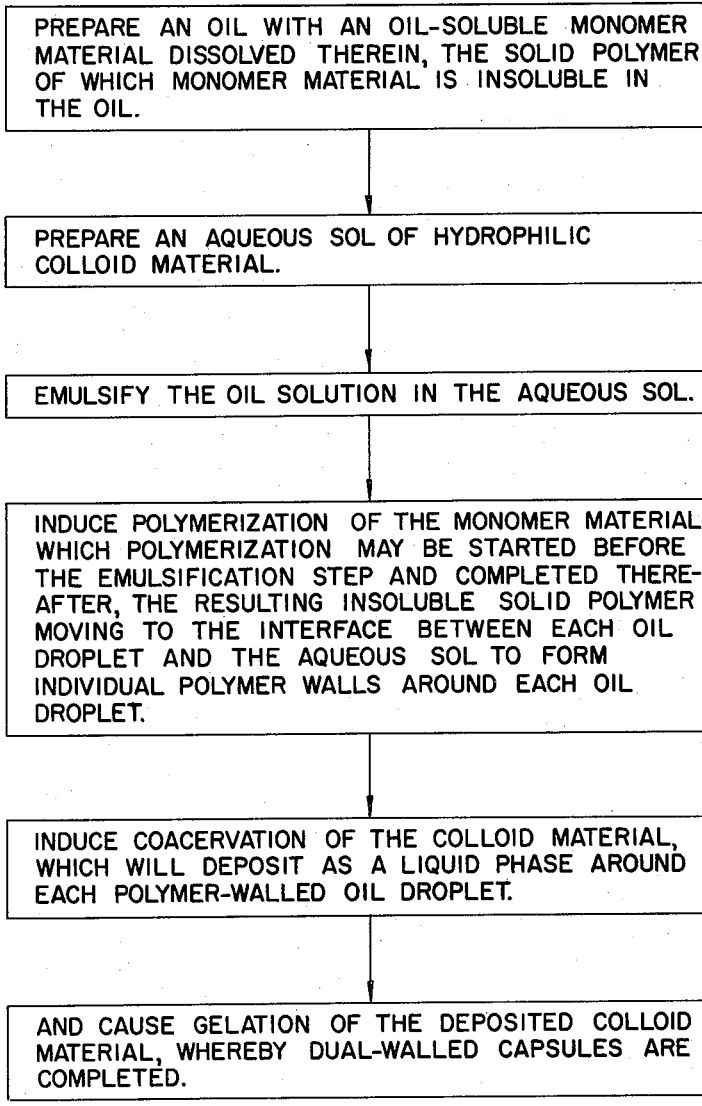

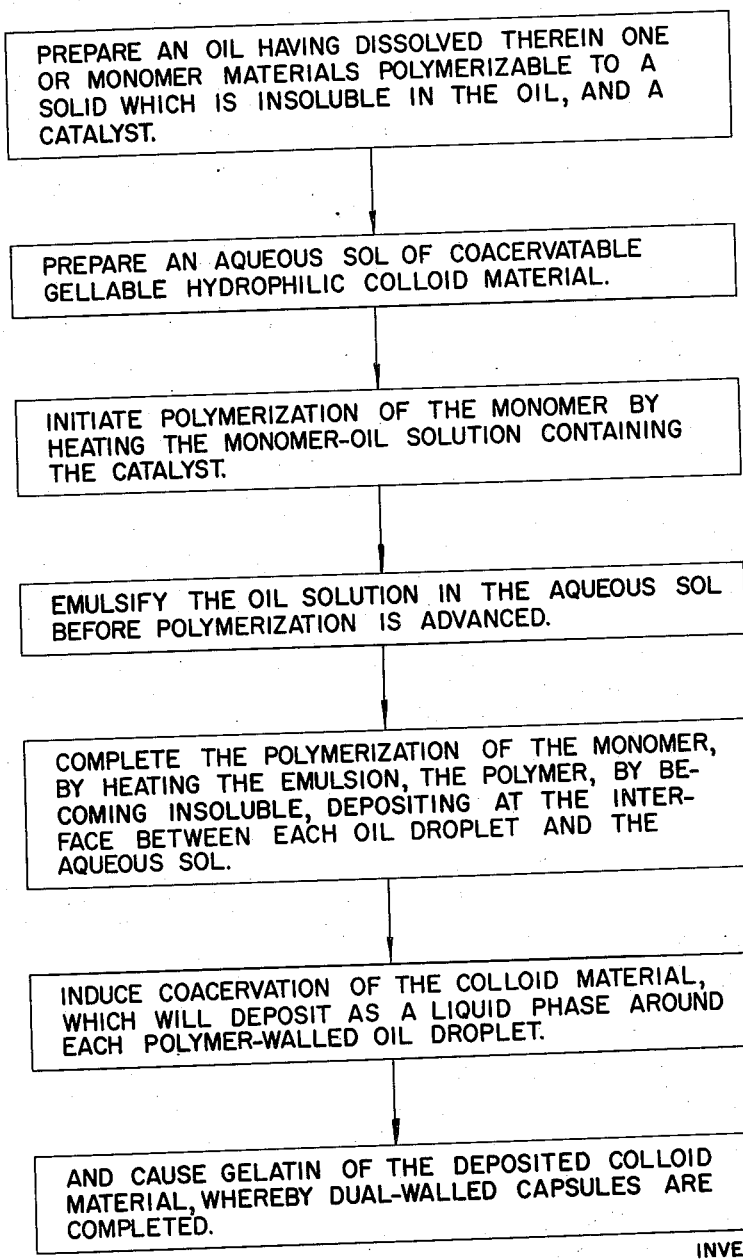

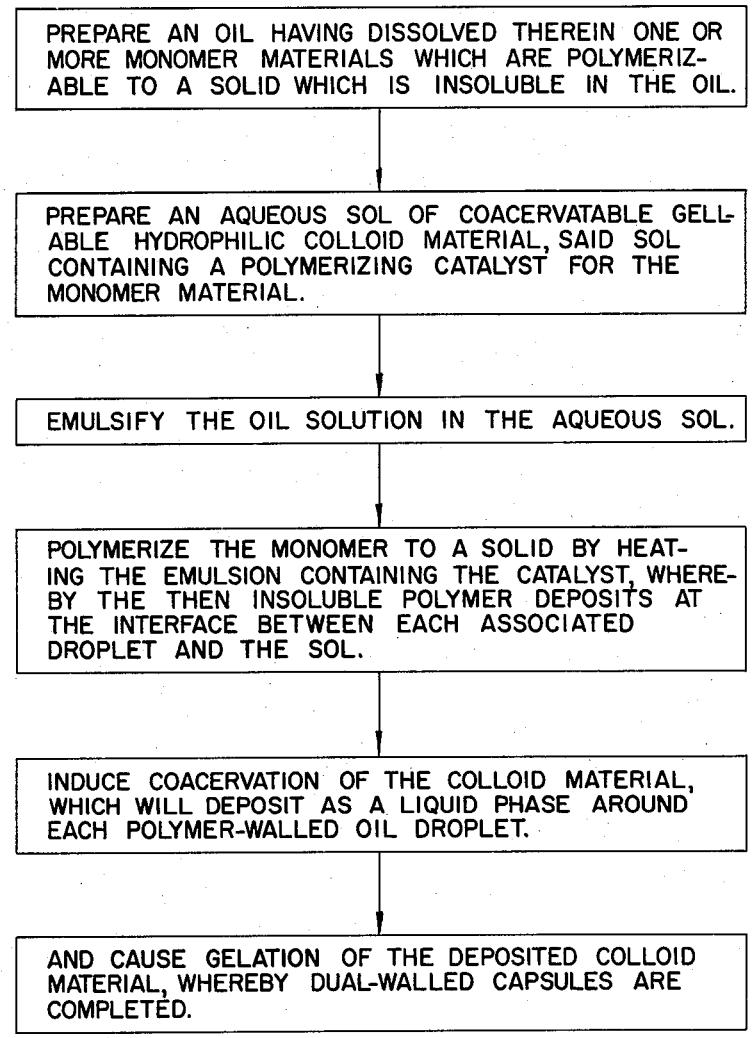

PREPARE AN INTERNAL PHASE INCLUDING AN OIL IN WHICH ARE DISSOLVED ONE OR MORE POLYMERIZABLE MONOMERS, THE POLYMER OF SAID MONOMER MATERIAL BEING INSOLUBLE IN THE OIL, SAID INTERNAL PHASE CONTAINING A FIRST CATALYST FOR THE MONOMER.

↓

HEAT THE INTERNAL PHASE TO A TEMPERATURE AT WHICH POLYMERIZATION OF THE MONOMER MATERIAL IS INITIATED.

↓

EMULSIFY THE INTERNAL PHASE IN AN AQUEOUS SOL OF A GELLABLE HYDROPHILIC FILM-FORMING COLLOID MATERIAL, THE COLLOID MATERIAL BEING KEPT FROM GELLING BY HEAT.

↓

DILUTE THE EMULSION WITH A HEATED AQUEOUS SOLUTION OF ANOTHER HYDROPHILIC COLLOID MATERIAL AND A SECOND CATALYST.

↓

WITH CONTINUED HEATING AND STIRRING REDUCE THE pH OF THE MIXTURE UNTIL COACERVATION OCCURS, WITH CONSEQUENT DEPOSITION OF THE COLLOID MATERIALS ON THE OIL DROPLETS.

↓

CONTINUE HEATING UNTIL POLYMERIZATION OF THE MONOMER IS COMPLETED AND THE POLYMER HAS DEPOSITED AT THE INTERFACE OF EACH OIL DROPLET AND THE COLLOID MATERIALS DEPOSITED THEREON.

↓

COOL THE MIXTURE TO CAUSE THE COLLOID MATERIALS TO FORM A GEL, WHEREBY THE OIL DROPLETS EACH ARE ENCAPSULATED IN A DUAL WALL, THE INNER WALL OF WHICH IS THE SOLID POLYMER MATERIAL AND THE OUTER WALL THE GELLED COLLOID MATERIAL.

INVENTORS
CARL BRYNKO
JOSEPH A. SCARPELLI

THEIR ATTORNEYS

FIG. 5

PREPARE AN OIL HAVING DISSOLVED THEREIN ONE OR MORE MONOMER MATERIALS POLYMERIZABLE TO A SOLID, SAID SOLID BEING INSOLUBLE IN THE OIL.

↓

DISPERSE THE OIL-MONOMER SOLUTION IN AN AQUEOUS MEDIUM CONTAINING A CATALYST FOR THE MONOMER, THE CATALYST BECOMING ACTIVE TO POLYMERIZE THE MONOMER WHEN HEAT IS APPLIED TO THE DISPERSION.

↓

HEAT THE DISPERSION TO CAUSE POLYMERIZATION OF THE MONOMER, THE POLYMER MOVING TO THE INTERFACE BETWEEN EACH ASSOCIATED OIL DROPLET AND THE AQUEOUS MEDIUM, WHERE IT FORMS AN INNER CAPSULE WALL AROUND EACH OIL DROPLET.

↓

DISSOLVE A GELLABLE HYDROPHILIC COLLOID MATERIAL IN THE AQUEOUS MEDIUM AND CAUSE COACERVATION OF THE COLLOID MATERIAL, WHICH COLLOID MATERIAL DEPOSITS AROUND EACH POLYMER-WALLED OIL DROPLET.

↓

AND GEL THE COLLOID MATERIAL TO FORM AN OUTER SOLID WALL ADHERENT TO THE SOLID POLYMER INNER WALL OF EACH CAPSULE.

INVENTORS
CARL BRYNKO
JOSEPH A. SCARPELLI

BY *Louis A. Kline*
*Justin S. Compton*

THEIR ATTORNEYS

United States Patent Office 2,969,331
Patented Jan. 24, 1961

2,969,331

PROCESS OF MAKING DUAL-WALLED OIL CONTAINING CAPSULES

Carl Brynko and Joseph A. Scarpelli, Dayton, Ohio, assignors to The National Cash Register Company, Dayton, Ohio, a corporation of Maryland Filed July 14, 1958, Ser. No. 748,512

5 Claims. (Cl. 252—316)

This invention relates to a process of making microscopic oil-containing capsules, each capsule having around a core of oil, an internal shell of solid polymerized monomer material and an external shell of solid film-forming hydrophilic colloid material, the internal and external shells of a capsule being adherent and forming a concentric dual wall around said core of oil.

Heretofore, oil-containing, pressure-rupturable microscopic capsules have been made having single walls of hydrophilic colloid material as disclosed in United States Patent No. 2,800,457 which issued on the application of Barrett K. Green and Lowell Schleicher on July 23, 1957, and in United States Patent No. 2,800,458 which issued on the application of Barrett K. Green on the same date. The capsules disclosed in those patents, while pressure-rupturable and substantially impermeable to the enclosed oil may be subject to attack chemically by some oils or materials carried in the oil. The double walls of the capsules disclosed herein are stronger, less oil permeable, and resistant to chemical attack for various substances to which the hydrophilic colloid material alone is not.

Applicant, Carl Brynko, filed on June 4, 1958, an application for United States patent, Serial No. 739,716, wherein oil-containing pressure-rupturable capsules are made by a process in which a shell of solid polymer material encloses the oil.

The dual-walled capsules of this invention are superior in strength and liquid retention as compared to the single walled polymer capsules mentioned, and because the internal wall is a solid polymer obtained by polymerization of a monomer material it can retain some liquids which might attack hydrophilic colloid film-forming material.

The encapsulated oil may carry, dispersed therein, inks, pigments, dyes, perfumes, fuels, chemical reactants, and other materials that may suffer from exposure to air or that will evaporate, or the oil itself may be a marking fluid, fuel, perfume, or a chemical reactant, or mixtures thereof.

Among the oil-carried materials may be mentioned pigments such as carbon-black and equivalent pigments having color. The oil itself may have an intrinsic color or have dissolved therein oil-soluble dyes. Among the animal oils may be mentioned sperm oil, lard oil, and neat's-foot oil. Vegetable oils such as castor oil, cottonseed oil, corn oil, and peanut oil, and mineral oils and artificial oils such as petroleum fractions, chlorinated diphenyl, and methyl salicylate may also be encapsulated by the process disclosed herein.

Briefly, the invention is concerned with the encapsulation of each of the oil droplets by two layers of solid material, that layer next to the oil being a polymerized monomer material, said polymer being formed from one or more monomer materials carried in the oil, and the outer layer being a hydrophilic colloid material deposited by coacervate forces from a polar solvent in which the colloid has been dispersed.

With these and other objects in view the invention will be described in detail with reference to the drawings.

Of the drawings:

Fig. 1 is a flow chart of the process in broad terms.

Fig. 2 is a flow chart of the process in a species of the invention wherein polymerization is initiated in a catalyst-containing oil-monomer solution and completed in the emulsion.

Fig. 3 is a flow chart of the process in a species of the invention in which the polymerization is initiated and completed in a catalyst-containing emulsion.

Fig. 4 is a flow chart in a species of the invention in which a catalyst is provided both in the oil-monomer solution and in the sol, and in which polymerization is induced and completed in an emulsion of the oil-solution in the sol.

Fig. 5 is a flow chart of a species of the invention in which polymer walled capsules are first formed and then sheathed with a colloid shell.

GENERAL DESCRIPTION

The invention will be described with reference to a preferred embodiment and species thereof.

In the preferred embodiment which will be described, the oil contains a colorless color-reactant substance, which on rupture of the capsules becomes available for use. The capsules may be coated on the underside of a transfer sheet which overlays a copy sheet, which latter-sheet contains a compound to cause the color reactant to assume a color. By marking-pressures applied to the front surface of the transfer sheet having the capsules, on the back thereof, the capsules will be ruptured and the oil and color reactant will be expressed onto the under sheet, there to make colored marks, as disclosed in United States Patent Number 2,548,366 which issued on the application of Barrett K. Green et al. on April 10, 1951.

Example I

In the preferred embodiment, an internal oil-monomer phase is made by dissolving in 140 grams of dichlorodiphenyl, 8 grams of styrene monomer, 2 grams of divinyl benzene monomer, 4 grams of benzoyl leuco methylene blue, 6 grams of crystal violet lactone, which is 3,3-bis (p-dimethylaminophenyl) 6-dimethylamino phthalide, and 0.03 gram of benzoyl peroxide as a catalyst. This internal phase, which is a color-reactant-carrying oil-monomer solution totalling about 160 grams, is heated to 85° centigrade and kept there for a period of 8 minutes to initiate polymerization of the monomer, which polymerization is completed later.

An external phase is prepared at 55° centigrade by dissolving in 1220 grams of water, 0.25 gram of potassium persulfate as a catalyst, and 20 grams of gum arabic, said solution being adjusted to pH 6.5. Into this external phase solution is mixed 160 grams of the internal phase emulsified in 182 grams of a sol of 11 percent, by weight, of gelatin in water, the system so made being kept at pH 6.5. The system comprising the external and internal phases, while still at 55° centigrade, has its pH adjusted slowly with constant stirring to 4.6 which causes coacervation of the colloid materials to occur with consequent deposition of the colloid around the internal phase droplets, individually, said internal phase droplets acting as seeding points, to form liquid colloid outer capsule walls. The system then is chilled to 15° centigrade to cause gelation of the colloid material around the polymer wall of each droplet to form the oil-containing dual-walled capsules.

The polymerization of the monomer has continued since its initiation. By the time coacervation is completed the polymer wall has been substantially formed to act as an inner foundation for the deposited colloid material.

If it is desired to harden the colloid walls around the capsules, 3.8 milliliters of a solution of 37 percent of formaldehyde in water is added to the system, preferably before the chilling. Inasmuch as the formaldehyde solution is more effective at high pH, the pH of the system is raised to 10, having previously added 15 grams of a 5 percent aqueous solution of a maleic anhydride copolymer such as polyvinyl methyl ether-maleic anhydride copolymer, its ethylene analogue, or equivalent material, which will keep the capsules from agglomerating.

Example II

In this example the catalyst also is introduced into the internal phase containing the monomer in the oil. As a specific formulation there are mixed together 140 grams of dichlorodiphenyl, 8 grams of styrene monomer, 2 grams of divinyl benzene monomer, 4 grams of benzoyl leuco methylene blue, 6 grams of crystal violet lactone, which is 3,3 - bis(p - dimethylaminophenyl) 6-dimethylamino phthalide, and 0.03 grams of benzoyl peroxide. This internal phase oil-monomer-catalyst-color reactant carrying solution which totals about 160 grams is heated to 85° centigrade for a period of eight minutes, to initiate polymerization of the monomer, which polymerization is completed while emulsifying the heated internal phase into an aqueous sol of gum arabic and gelatin consisting of 1380 grams of water, 20 grams of gum arabic, and 20 grams of gelatin (said gum arabic-gelatin sol having been adjusted to 6.5), and heated to 55° centigrade. The pH is adjusted to 6.5 by an aqueous solution of sodium hydroxide. Next coacervation is induced by adjusting the pH slowly to 4.6 with constant stirring and with the temperature maintained at 55° centigrade. During this process the colloid material which has formed a gelatin-gum arabic complex deposits, as a liquid, uniformly about the solid polymer shells which have formed about the oil of the internal phase droplets. The polymer shells have been formed sufficiently to act as a base for the deposited liquid colloid coacervate material. The liquid colloid encapsulating walls are made solid by gelling which is brought about by lowering the temperature to 15° centigrade, more or less. The external capsule walls of solidified colloid material may be hardened, if desired, as set forth in Example I.

Example III

In this form of the invention the polymerization of the monomer to form the inner solid walls of the capsules is carried out in the emulsion mixture by introducing the catalyst either into the external phase before emulsification of the internal phase therein, or after emulsification, as desired.

Specifically relating to the encapsulation of kerosene, a solution of 8 grams of styrene monomer, 2 grams of divinyl benzene monomer, and 90 grams of kerosene is emulsified into an aqueous sol consisting of 1220 grams of water in which is dissolved 20 grams of gum arabic and 20 grams of gelatin (said sol having previously been adjusted to pH 6.5). The emulsion, kept at pH 6.5, is heated to 55° centigrade and kept at that temperature during the coacervation step to be described. With constant stirring 0.5 gram of potassium persulfate, as a catalyst, is introduced. Polymerization of the monomer material will be substantially completed in several hours, the polymer in each droplet of the kerosene phase, because it is insoluble therein, depositing at the interface between each kerosene droplet and the aqueous sol to form a solid internal wall on the outside of each kerosene droplet. Next, the temperature and stirring being maintained, coacervation is induced by lowering the pH of the stirring mixture to 4.6, whereupon the gum arabic and gelatin, which have formed a complex, deposits around each polymer-walled droplet as a liquid colloid-rich outer wall. These capsules are then cooled to 15° centigrade, by cooling the mixture, to gell the colloid material to a solid, thus forming capsules of kerosene having dual walls. These capsules, as with the capsules in Examples I and II may be recovered in "dry" form by removing the residual water by filtering and/or spray drying, or equivalent. The capsules of Example III may be hardened like those of Example I.

So far, the examples given have specified certain monomers, certain catalysts, and certain oils. As equivalent monomers to be used in the internal phase may be mentioned ethyl acrylate, methyl acrylate, methyl methacrylate, ethyl methacrylate, and vinyl acetate, although there are many others. Of oils equivalent to dichlorodiphenyl and kerosene, may be mentioned dibutyl phthalate, cottonseed oil, and lard oil.

Among catalysts which may be used as substitutes for those already mentioned are acetyl peroxide, di-tertiary-butyl peroxide, alpha-alpha-azo-di-isobutyronitrile, hydrogen peroxide, calcium peroxide, zinc peroxide, and sodium pyrophosphate peroxide. The catalyst or catalysts used, as they may be mixed, may be oil soluble, water soluble, or insoluble in oil or water, as they will eventually end up at the interfaces between the oil droplets and the polar liquid to effect their purpose.

It will be apparent that the ingredients named in the specific examples, and the equivalents set forth are not to be deemed to limit the invention which will be described in the claims to follow.

What is claimed is:

1. A process for making pressure-rupturable microscopic oil-containing capsules each having around a central nucleus of oil, a dual wall structure consisting of an inner wall of solid material and an outer wall of solid material adherent to the inner wall, and the walls being of different chemical substances, including the steps of preparing an oil with at least one oil-soluble monomer material dissolved therein, the monomer material when polymerized being insoluble in the oil; preparing an aqueous sol of gellable hydrophilic film-forming colloid material; dispersing the oil-monomer solution in the sol as droplets; inducing polymerization of the monomer which polymerization is started during the foregoing steps; causing the colloid material to coacervate, resulting in the deposition of the colloid as a liquid around each droplet, the polymerized monomer material, because of its insolubility in the oil, forming a solid inner wall at the interface between the oil of each droplet with the colloid material deposited therearound; and gelling the colloid to form an outer solid wall of colloid material around each inner wall of polymer material to form said dual-walled capsules.

2. A process for making pressure-rupturable microscopic oil-containing capsules, each capsule having around a central nucleus of oil a dual capsule wall consisting of an inner wall of a solid polymerized monomer material and an outer wall of a solid gelled film-forming hydrophilic colloid material, including the steps of preparing a solution of an oil, a monomer polymerizable to a solid, and a heat-activatable catalyst; preparing an aqueous sol of a film-forming hydrophilic colloid material; heating the solution and the sol, said heating of the solution being sufficient to initiate polymerization of the monomer and the heating of the sol preventing the colloid material from gelling; dispersing the heated solution in the sol while polymerization is in progress, to form droplets, the polymer when formed in a droplet depositing at the interface between the remaining oil and the sol as a solid inner wall; effecting coacervation of the colloid in the sol whereby the colloid deposits in liquid form around the droplets, individually, to form an outer wall around each droplet; and gelling the colloid material by cooling to form the deposited coacervate into an adherent solid wall around the solid polymer wall of each droplet, whereby said dual-walled capsules are formed.

3. A process for making pressure-rupturable microscopic oil-containing capsules, each capsule having a dual wall around a central nucleus of oil, said dual wall consisting of an inner wall of solid polymerized monomer material having adherent thereto an outer wall of gelled hydrophilic film-forming colloid material, including the steps of preparing a solution of a selected oil and monomer material which when polymerized is insoluble in the oil; dispersing the oil-solution in a hot aqueous sol of gellable film-forming hydrophilic colloid material to form droplets, said aqueous sol being supplied with a heat-activatable catalyst which catalyst when active effecting polymerization of the monomer, the polymer of said monomer material because it is insoluble in the oil in a droplet moving to the interface of the oil and the aqueous sol, there to form a solid inner capsular wall around the associated oil; effecting coacervation of the colloid material which deposits as a liquid around each polymer walled capsule; and gelling the deposited colloid material to a solid which forms an adherent outer wall around each polymer wall, to form dual-walled capsules.

4. A process for making pressure-rupturable microscopic oil-containing capsules including the steps of providing a hot aqueous sol of a hydrophilic colloid material which forms a gel on cooling; disperse in the sol a solution of oil and one or more monomer materials polymerizable to a solid which is insoluble in the oil, to form droplets; introduce a polymerizing catalyst into the dispersion to polymerize the monomer material so it becomes insoluble in the droplets of oil and deposits at the interface between each of the associated oil droplets and the colloid sol to form inner walls; effecting coacervation of the colloid material which deposits as a liquid on the inner polymer walls to form outer walls; and effecting gelation of the deposited colloid liquid to form solid outer walls in the droplets, thus forming dual-walled capsules.

5. A process for making dual-walled microscopic oil-containing capsules, including the steps of providing an aqueous medium in which is dissolved a gellable hydrophilic film-forming hydrophilic colloid material, and in which is dispersed droplets of an oil in which droplets are dissolved one or more monomer materials polymerizable to a solid, the polymers being insoluble in the oil, and said aqueous sol dispersion being heated to prevent gelation of the colloid material; introducing a polymerizing catalyst into the aqueous sol dispersion to polymerize the monomer material in each droplet, the polymer moving to the interface between each oil droplet and the sol to form an inner solid wall with an oil nucleus; effecting coacervation of the colloid material which forms as a liquid phase around each inner wall of polymer material; and cooling the aqueous medium containing the oil droplets each encased in the solid polymer inner wall and the liquid colloid phase, to form a gelled solid colloid outer wall around the inner wall of each oil droplet, to form dual-walled capsules.

References Cited in the file of this patent
UNITED STATES PATENTS

| | | |
|---|---|---|
| 2,275,154 | Merrill et al. | Mar. 3, 1942 |
| 2,331,572 | Scherer | Oct. 12, 1943 |
| 2,491,475 | Bogin | Dec. 20, 1949 |
| 2,732,351 | Clarke | Jan. 24, 1956 |
| 2,770,571 | Vance et al. | Nov. 13, 1956 |
| 2,800,457 | Green et al. | July 23, 1957 |
| 2,800,458 | Green | July 23, 1957 |